United States Patent [19]
Stein

[11] Patent Number: 5,694,342
[45] Date of Patent: Dec. 2, 1997

[54] METHOD FOR DETECTING SIGNALS IN NON-GAUSSIAN BACKGROUND CLUTTER

[75] Inventor: David W. J. Stein, San Diego, Calif.

[73] Assignee: The United States of America as represented by the Secretary of the Navy, Washington, D.C.

[21] Appl. No.: 742,413

[22] Filed: Oct. 24, 1996

[51] Int. Cl.⁶ .............................. H03M 1/08; H04B 1/10
[52] U.S. Cl. ...................... 364/572; 364/574; 342/159; 375/227; 340/310.03
[58] Field of Search .................... 364/516, 574, 364/572, 724.01; 375/285, 227, 346, 254, 350; 329/320, 318, 349, 353; 340/310.03; 342/203, 159; 348/607; 370/317; 381/71, 94

[56] References Cited

U.S. PATENT DOCUMENTS

| | | |
|---|---|---|
| 4,870,603 | 9/1989 | Padawer . |
| 4,956,792 | 9/1990 | Sekine . |
| 4,970,660 | 11/1990 | Marchant . |
| 5,337,055 | 8/1994 | Ghignoni . |
| 5,457,462 | 10/1995 | Mitsumoto et al. . |
| 5,499,195 | 3/1996 | Castelaz . |

OTHER PUBLICATIONS

Stein, "Detection of Random Signals in Gaussian Mixture Noise", *IEEE Transactions on Information Theory*, vol. 41, No. 6, 6 Nov. 1995, pp. 1788–1801.
Bond et al., "A Unified Theory of Adaptive Locally Optimum Processing", IEEE, pp. 1594–1597, 1993.
Hummels et al., "Locally Optimal Detection of Unknown Signals in Non–Gaussian MarkovNoise", IEEE, pp. 1098–1101, 1992.
Hummels et al., "Adaptive Locally Optimal Detection Using RBF Neural Network", IEEE, pp. 3050–3055, 1994.
Au, "Locally Optimal and Suboptimal Signal Detection in Transformation Noise", IEE Transactions on Aerospace & Electronic Systems, vol. 32, No. 2, pp. 742–753, Apr. 1996.

*Primary Examiner*—Emanuel T. Voeltz
*Assistant Examiner*—Patrick J. Assovad
*Attorney, Agent, or Firm*—Harvey Fendelman; Michael A. Kagan; Peter A. Lipovsky

[57] ABSTRACT

The invention provides a method for detecting signals in non-Gaussian background clutter, comprising the steps of: 1) filtering input data to partition Gaussian input data from non-Gaussian input data; 2) estimating the intensity level of the Gaussian input data; 3) determining the probability distributions of the non-Gaussian input data; 4) determining the background noise level of the input data; 5) estimating noise parameters of the input data; 6) estimating the residual intensity of the input data using the noise parameters; 7) determining a detection statistic M from the input data, estimated noise parameters, and the residual intensity of the input data; 8) determining a standard deviation $N_i$ of the detection statistic, $M_i$; 9) determining a normalized detection statistic Si, where $S_i = M_i/N_i$; 10) determining a maximum value, $S_{imax}$ of $S_i$; 11) determining a mean value $S_{Mean}$ and standard deviation $S_{Std\ dev}$ of all $S_i$ excluding $S_{imax}$; 12) determining a threshold $\tau_\alpha$ of a zero mean unit variance normal distribution corresponding to a predetermined false alarm probability, where $\alpha$ is a predetermined false alarm probability; and 13) generating an output signal if $[S_i-S_{Mean}]/S_{Std\ dev} \geq \tau_\alpha$. The invention may also be implemented as a program storage device readable by a machine which tangibly embodies a program of instructions executable by the machine to perform the above-referenced method steps.

38 Claims, 4 Drawing Sheets

5,694,342

METHOD FOR DETECTING SIGNALS IN NON-GAUSSIAN BACKGROUND CLUTTER

BACKGROUND OF THE INVENTION

The present invention relates to the field of signal processing, and more particularly to a method for detecting weak signals in a non-Gaussian, non-stationary background.

Many signal detection schemes in use today, including intensity-only and Doppler processors, are based on optimal detection formulas derived from Gaussian noise models. For example, signal detection schemes employing constant false alarm rate (CFAR) algorithms use the power detector, which is obtained from optimal detection theory by assuming a random signal and Gaussian noise, with an adaptive noise power estimator.

FIG. 1 shows the components of a basic CFAR detector. The input data is a collection of successive intensities (norm squared) of baseband demodulated radar returns from a set of range bins organized into a range-by-pulse matrix $X=(x_{ij})$, where R is the number of range bins, P is the number of pulses and $1 \leq i \leq R$, $1 \leq j \leq P$. The steps in the processing include estimating the power in the $i^{th}$ bin using the formula:

$$p_i = \frac{1}{2P} \sum_{j=1}^{P} x_{ij}. \quad (1)$$

The noise power estimate for the $i^{th}$ bin, $\eta_i$, is then the output of a filter, O, that may be defined using an order statistic that selects a predetermined percentile, as:

$$\eta_i = O(p_{i-L/2-g}, \ldots, p_{i-g-1}, p_{i+g+1}, \ldots, p_{i+L/2+g}), \quad (2)$$

where g is the number of guard bins on either side of the test bin, and L is the number of range bins used to form the estimate of the noise power.

The detection statistic for the $i^{th}$ bin, $t_i$, may be calculated for each range bin by normalizing and summing the input data according to the formula:

$$t_i = \frac{1}{\eta_i} \sum_{j=1}^{P} x_{ij}. \quad (3)$$

The threshold may be set as a fixed number, T, calculated using a predetermined false alarm rate and the assumption that under the noise only hypothesis the statistics, $t_i$, are unit chi-squared random variables on 2P degrees of freedom. Alternatively, the threshold for the $i_{th}$ bin may be set using a function of the values of $t_l$ for l near i or determined by an operator.

To avoid an excessive false alarm rate when applied to non-Gaussian noise, many CFAR processors use a high threshold which makes it unlikely that weak signals will be discerned from the noise. Therefore, a need exists for a detector which can detect weak signals from a non-Gaussian noise background, yet which has a low false alarm rate.

SUMMARY OF THE INVENTION

The invention provides a method for detecting signals in non-Gaussian background clutter, comprising the steps of: 1) filtering input data to segregate Gaussian input data from non-Gaussian input data; 2) estimating the intensity level of the Gaussian input data; 3) determining the probability distributions of the non-Gaussian input data; 4) determining the background noise level of the input data; 5) estimating noise parameters of the input data; 6) estimating the residual intensity of the input data using the noise parameters; 7) determining a detection statistic M from the input data, estimated noise parameters, and the residual intensity of the input data; 8) determining a standard deviation $N_i$ of the input data; 8) determining a standard deviation $N_i$ of the detection statistic, $M_i$; 9) determining a normalized detection statistic $S_i$, where $S_i=M_i/N_i$; 10) determining a maximum value, $S_{imax}$ of $S_i$; 11) determining a mean value $S_{Mean}$ and a standard deviation $S_{Std\ dev}$ of all $S_i$ excluding $S_{imax}$; 12) determining a threshold $\tau_\alpha$ of a zero mean unit variance normal distribution corresponding to a predetermined false alarm probability, where $\alpha$ is a predetermined false alarm probability; and 13) generating an output signal if $[S_i-S_{Mean}]/S_{Std\ dev} \geq \tau_\alpha$.

The invention may also be characterized as providing a method for detecting signals in non-Gaussian background clutter, comprising the steps of: 1) filtering input data to partition Rayleigh input data from non-Rayleigh input data; 2) estimating the intensity level of the Rayleigh input data; 3) determining the probability distributions of the non-Rayleigh input data. 4) determining the background noise level of the input data; 5) estimating noise parameters of the input data; 6) estimating the residual intensity of the input data using the noise parameters; 7) determining a detection statistic $M_i$ from the input data, estimated noise parameters, and the residual intensity of the input data; 8) determining the standard deviation $N_i$ of the detection statistic, $M_i$; 9) determining a normalized detection statistic $S_i$, where $S_i=M_i/N_i$. 10) determining a maximum value, $S_{imax}$ of $S_i$; 11) determining a mean value $S_{Mean}$ and a standard deviation $S_{Std\ dev}$ of all $S_i$ excluding $S_{imax}$; 12) determining a threshold $\tau_\alpha$ of a zero mean unit variance normal distribution corresponding to a predetermined false alarm probability, where $\alpha$ is a predetermined false alarm probability; and 13) generating an output signal if $[S_i-S_{Mean}]/S_{Std\ dev} \geq \tau_\alpha$.

The invention may further be implemented as a method for detecting signals in non-Gaussian background clutter, comprising the steps of: 1) filtering input data to partition exponential input data from non-exponential input data; 2) estimating the intensity level of the exponential input data; 3) determining the probability distributions of the non-exponential input data; 4) determining the background noise level of the input data; 5) estimating noise parameters of the input data; 6) estimating the residual intensity of the input data using the noise parameters; 7) determining a detection statistic $M_i$ from the input data, estimated noise parameters, and the residual intensity of the input data; 8) determining the standard deviation $N_i$ of the detection statistic, $M_i$; 9) determining a normalized detection statistic $S_i$, where $S_i=M_i/N_i$. 10) determining a maximum value, $S_{imax}$ of $S_i$; 11) determining a mean value $S_{Mean}$ and a standard deviation $S_{Std\ dev}$ of all $S_i$ excluding $S_{imax}$; 12) determining a threshold $\tau_\alpha$ of a zero mean unit variance normal distribution corresponding to a predetermined false alarm probability, where $\alpha$ is a predetermined false alarm probability; and 13) generating an output signal if $[S_i-S_{Mean}]/S_{Std\ dev} \geq \tau_\alpha$. The invention may also be implemented as computer program instructions written on a computer readable storage device. When executed, the program instructions cause the computer to perform the above-referenced method steps.

An advantage of the invention is that it selects noise-only mixture parameters using order statistics.

Another advantage of the invention is that the detector may optionally estimate the highest state variance using global data, and the combination of the high state parameters with the parameters estimated for each range bin.

Still another advantage of the invention is that it uses an estimate of the signal strength to modify the locally optimal detector so that the resulting detector will be able to detect signals that are not vanishingly small.

A further advantage of the invention is that it sets thresholds using the moments calculated from the multi-state mixture parameters used to process the data.

These and other advantages of the invention will become more apparent upon review of the accompanying drawings and specification, including the claims.

BRIEF DESCRIPTION OF THE DRAWINGS

Throughout the several figures, like references refer to like elements.

DESCRIPTION OF THE PREFERRED EMBODIMENT

The following description is of the best mode presently comtemplated for carrying out the invention. This description is not to be taken in a limiting sense, but is made merely for the purpose of describing the general principles of the invention. The scope of the invention should be determined with reference to the claims.

The present invention provides a method for detecting weak signals in a non-Gaussian and non-stationary background, such as radar sea clutter, acoustic data containing moving interferers, and seismic data. The invention preferably may be implemented as computer readable program instructions which may be encoded onto a program storage device such as magentic tape, a floppy disk, magnetooptical disk, compact disk, or the like. The storage device embodies the program of computer executable instructions for implementing the function of detecting weak signals in non-Gaussian and non-stationary backgrounds.

Figure 1:
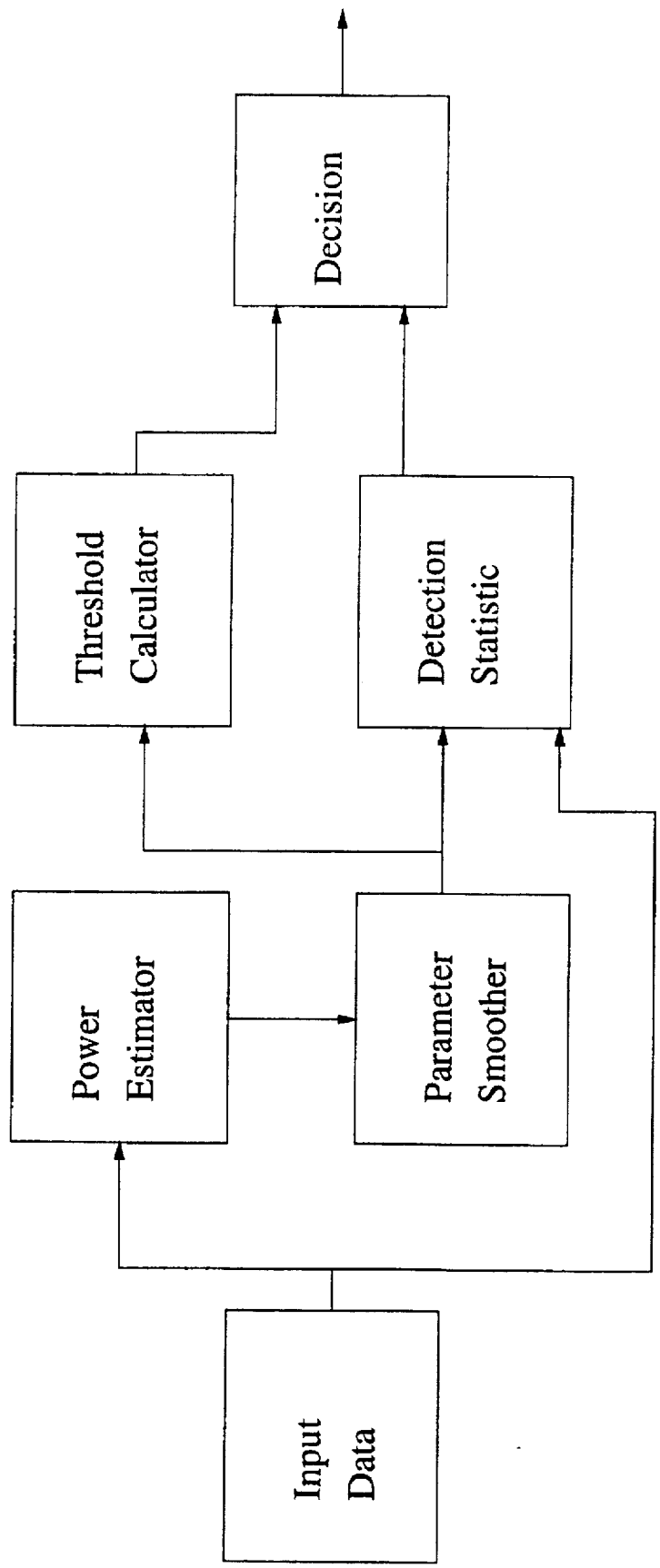
FIG. 1 is a block diagram of the basic components of a constant false alarm rate (CFAR) detector.
Figure 2:
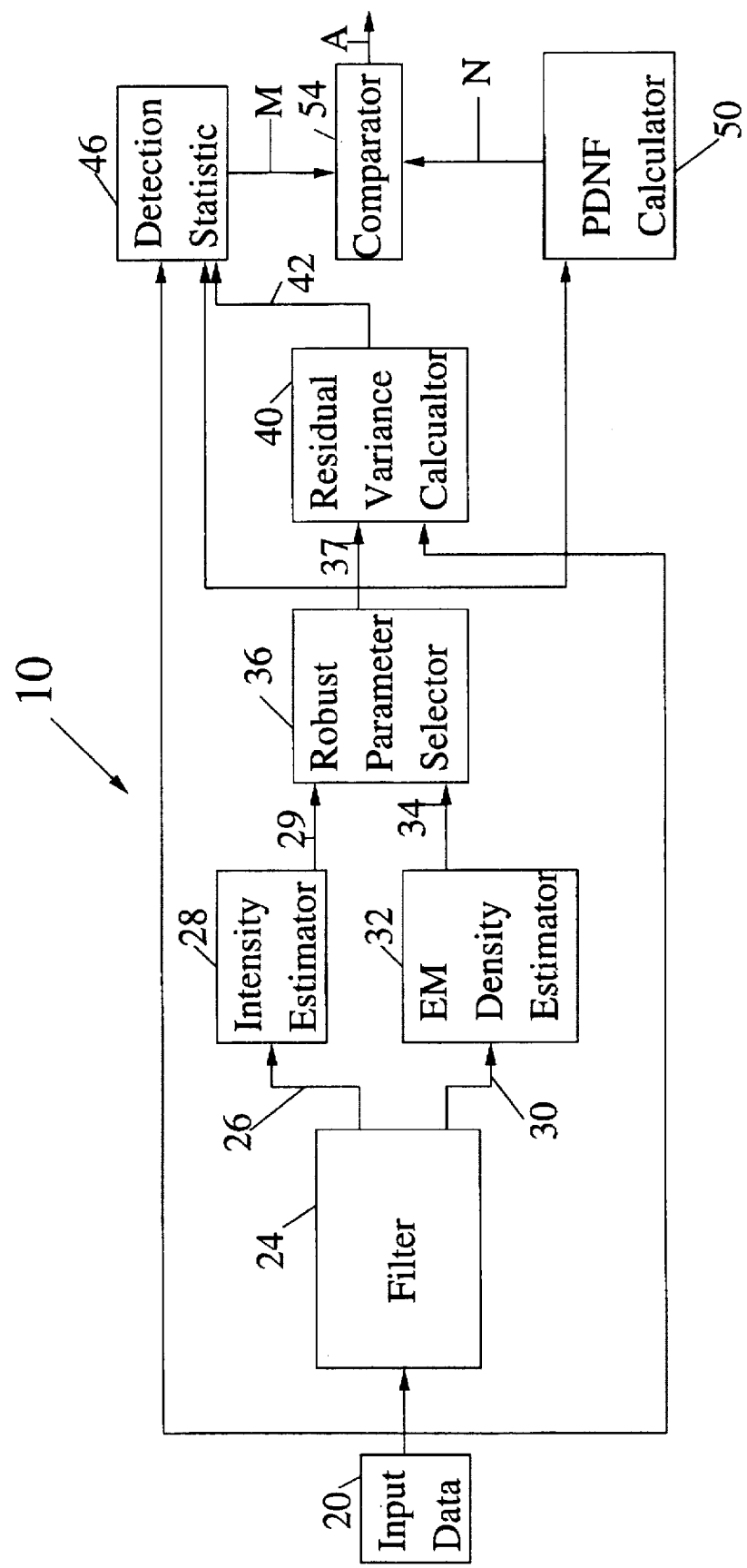
FIG. 2 is a block diagram of the basic components of a system for detecting signals in non-gaussian background clutter which embodies various features of the present invention.

Referring to FIG. 2, input data 20 is provided to a computer readable program instructions referenced as a filter 24 of a detector 10. The filter 24 divides the input data 20 into data 26 which may include Gaussian data, Rayleigh data, or exponential data, and into data 30 which may include non-Gaussian data, non-Rayleigh data, and non-exponential data 30. If data 26 includes Gaussian data, then data 30 includes non-Gaussian data. If data 26 includes Rayleigh data, then data 30 includes non-Rayleigh data. If data 26 includes exponential data, then data 30 includes non-exponential data. The input data may be partitioned into groups of data 26 and 30 using a suitable statistical goodness of fit test, such as the Kolmogorov-Smirnov (KS1) test or Chi-Square test to reduce computational requirement. Next, the data 26 is provided to computer readable program instructions referenced as an intensity estimator 28 which generates estimates 29 of the intensity level of the input data 26. The input data 30 is received by computer readable program instructions referenced as a density estimator 32 which fits the data 30 to a family of first functions by estimating first parameters of the functions to determine the probability distributions of the data which are provided as output 34. The functions may be exponential mixture probability density functions. An example of an m-state exponential mixture probability density function with parameters $(p_1, \ldots, p_m, v_1, \ldots, v_m)$ such that $$p_k \geq 0, \sum_{k=1}^{m} p_k = 1,$$

and $v_1 < \ldots < v_m$ is:

$$p(t) = \sum_{k=1}^{m} \frac{p_k}{2v_k} e^{-\frac{t}{2v_k}} \quad (4)$$

The expectation maximization (EM) density estimator 32 estimates for the $i^{th}$ range bin, $p_k^i$ and $w_k^i$ for prescribed values of m, wherein different values of m may be used to suit the requirements of a particular application. The values of $p_k^i$ and $v_k^i$ are provided as output 34 from the EM density estimator 32. The first functions may also be Gaussian mixture probability density functions. Alternatively, the EM density estimator 32 may apply a quasi-Newton optimization algorithm to the output of the expectation and maximization algorithm to possibly speed the parameter estimation procedure.

Computer readable program instructions referenced as a robust parameter selector 36 employs the outputs 29 and 34 to determine the parameters 37 of the background noise of the input data 20. The input data 20 contains noise components and possibly components representing a signal of interest. However, a detection statistic M, which is a function of the noise parameters 37 and the input data 20, relates the input data 20 to a threshold in order to discern a possible signal of interest. Therefore, noise parameters 37 of the input data 20 are estimated, and are determined in the robust parameter selector 36 which may be implemented as computer readable subroutine ROBPARSEL10.m (Appendix 1), written, by way of example, in MATLAB™. The robust parameter selector 36 transforms the outputs 29 and 34 into adjusted estimate outputs 37 of a selected set of the first parameters $p_k^i$ and $v_k^i$, by using order statistics applied to subsets of the parameters $p_k^i$ and $v_k^i$, where if m=2, then k=1, and a "clutter plus noise parameter," cpn(θ), where $$cpn(\theta)^i = \sum_{k=1}^{m} p_k^i v_k^i.$$

The robust parameter selector 36 mimimizes the generation of false alarms by detector 10.

ROBPARSEL10.m, presented by way of example, in APPENDIX 1, determines exponential mixture parameters 37 of the noise in the input data 20. For each range bin ROBPARSEL10.M determines robust estimates of the two-state exponential mixture density for the noise component of the input data. The input and output parameters of ROBPARSEL10.m are described below in Tables I and II, respectively. ROBPARSEL10.m, lines 52–58 determines a robust noise power estimate by using an order statistic as defined in equation (2). Alternatively, a smoothing filter, such as the mean or the sensored mean, may be used in place of the order statistics used here. ROBPARSEL10.m, lines 59–62 use an order statistic to estimate the value of $v_1$ corresponding to the noise component of the input data 20. At lines 63–67, ROBPARSEL10.m modifies the value of $p_1$ based upon the revised value of $v_1$. Under appropriate condition, lines 72–87 of ROBPARSEL10.m collapse the current two-state parameters to one state. Lines 99–101 of ROBPARSEL10.m use an order statistic to re-estimate the noise power of the input data using a possibly different number of guard bands than was done above in lines 52–58.

At lines 102–104, ROBPARSEL10.m uses an order statistic to estimate the value of $p_2$ of the noise component of the input data 20. Lines 106–115 of ROBPARSEL10.m calculate the value of $v_2$ of the noise component of the input data. 20. Depending upon the value of v2oflag, lines 131–185 of ROBPARSEL10.m scale $v_2$. At lines 187–196, ROBPARSEL10.m scales $p_1$, depending upon the value of the input parameter pLflag,. The variable $v_1$ is scaled at lines 197–210 of ROBPARSEL10.m depending upon the value of v1flag.

TABLE I

Input Parameters for ROBPARSEL10.m

| Parameter | Description |
|---|---|
| unempar2 | exponential mixture parameters of the input data |
| npow | average intensity of the input data |
| gbv | vector of guard bands used by the order statistics |
| perv | percentile vector used by the order statistics |
| nbv | number of bins used by the order statistics |
| v2oflag | flag used to control the scaling of $v_2$ |
| v1flag | flag used to control the scaling of $v_1$ |
| pLflag | flag used to control the scaling of $p_1$ |

TABLE II

Output Parameters for ROBPARSEL10.m

| Parameter | Description |
|---|---|
| mnpar | estimates of the exponential mixture parameters of the noise data |
| mpow | estimates of the intensity of the noise data |

Still referring to FIG. 2, for the $i^{th}$ range bin, a residual variance calculator 40 transforms the output 37 from the robust parameter selector and the input data 20 into an estimate output 42 of the signal strength of any signal of interest which may be in the input data 20. The residual variance calculator 40 may produce the signal strength estimate $v_s^i$ (residual intensity) used by the detection statistic M according to the formula:

$$v_s^i = \max\left\{ 0, \frac{1}{2P} \sum_{j=1}^{P} x_{ij} = \sum_{k=1}^{m+1} p_k \tilde{v}_k^i \right\} \quad (5)$$

Next, computer readable program instructions referenced as detection statistic calculator 46 transforms the input data 20 and the outputs 37 and 42 into an exponential mixture amplitude detection statistic, M, or simply, "detection statistic" which may be determined as follows: Let $\theta^i = (\tilde{p}_1^i, \ldots, \tilde{p}_{m+1}^i, \tilde{v}_1^i, \ldots, \tilde{v}_{m+1}^i, \tilde{v}_s^i)$ be the outputs 37 and 42, then the detection statistic, M, for the $i^{th}$ range bin is calculated according to the formulas:

$$M(x_{i1}, \ldots, x_{iP}) = \frac{1}{2} \sum_{j=1}^{P} \sum_{k=1}^{m+1} \left( \frac{-2}{\tilde{v}_k^i} + \frac{x_{ij}}{(\tilde{v}_k^i)^2} \right) p(k|x_{ij}, \theta^i) \quad (6)$$

and $$p(k|x_{ij}, \theta^i) = \frac{ae^b}{\sum_{k=1}^{m+1} ce^d} \quad (7)$$

where:

$$a = \frac{p_k^i}{2(\tilde{v}_k^i + \tilde{v}_s^i)} \quad b = \frac{-x_{ij}}{2(\tilde{v}_k^i + \tilde{v}_s^i)}$$

-continued $$c = \frac{p_l}{2(\tilde{v}_l^i + \tilde{v}_s^i)} \quad d = \frac{-x_{ij}}{2(\tilde{v}_l^i + \tilde{v}_s^i)}$$

Computer readable program instructions referenced as parameter dependent normalization factor calculater 50 uses output 37 to determine a normalization factor, N, for each range bin. The normalization factor may be obtained by determining k moments of the distribution of the detection statistic M, where k is a positive integer and preferably, where k=2. The moments may be calculated or obtained from a look-up table.

The k moments of the detection statistic may be determined in accordance with the following procedures: M may be approximated by a piecewise polynomial function obtained from piecewise polynomial approximations of the state weighting functions $w_k^i(x_{ij})=p(k|x_{ij}, \theta^i)$. For an m-state mixture $\lim_{u \to \infty} w_m(u)=1$. Select K so that if u>K then $w_m(u) \approx 1$. Select the degree, d, and number, p, of the polynomials to be used in the approximation. Define a partition:

$$\{0 = u_0 < \ldots < u_r = K\} \text{ of } [0, K] \text{ by } u_r = (r \cdot K)/(d \cdot p) \text{ for } 0 \leq r \leq p \cdot d$$

Then for each $1 \leq j \leq m-1$ and each $1 \leq l \leq p$ let $P_{lj}$ be the Lagrange interpolating polynomial of degree d defined by $[u_{(l-1)d}, \ldots, u_{ld}]$ and $[w_j(u_{(l-1)d}), \ldots, w_j(v_{ld})]$. Other conditions, such as continuity of the derivatives up to certain orders at the points $(u_r)$ or vanishing of certain derivatives at 0 and K, may also be imposed. Also, define:

$$P_{p+1j}(u) \equiv \begin{cases} 0, & \text{if } 0 \leq j < m; \\ 1, & \text{otherwise} \end{cases}$$

For a set A, let $\chi_A$ be the characteristic function of A, i.e. $\chi_A(u)=1$ if $u \in A$ and 0 otherwise. Define the piecewise polynomial approximation of the weighting functions by:

$$Pw_j(u) = \sum_{l=1}^{p} \chi_{[u_{(l-1)d}, u_{ld}]}(u) P_{lj}(u) + \chi_{[u_{pd}, \infty)} P_{p+1j}(u), \quad (8)$$

and the approximate detector by $$P\hat{M}(u) = \sum_{j=1}^{m} \left( \frac{-2}{v_j} + \frac{u}{v_j^2} \right) Pw_j(u). \quad (9)$$

Since P M̂ is piecewise polynomial, its moments are easily calculated for Gaussian mixture, Rayleigh mixture, or exponential mixture noise and a Gaussian signal having variance $v_s$. Other signal models require appropriate modifications. For $1 \leq l \leq p+1$ define:

$$Q_l(u) \equiv \left[ \sum_{j=1}^{m} \left( \frac{-2}{v_j} + \frac{u}{v_j^2} \right) P_{lj}(u) \right] \chi_{[u_{(l-1)d}, u_{ld}]}, \quad (10)$$

and define $u_{(p+1)d} = \infty$. Then, $$P\tilde{M}(u) = \sum_{l=1}^{p+1} Q_l(u),$$

and $$E(P\hat{M}^k) = \int_{-\infty}^{\infty} \left( \sum_{l=1}^{p+1} Q_l(u) \right)^k p(u) du \quad (11)$$

$$= \sum_{l=1}^{p+1} \int_{u_{d(l-1)}}^{u_{dl}} (Q_l(u))^k p(u) du$$

$$= \sum_{l=1}^{p+1} \sum_{j=1}^{m} \int_{u_{d(l-1)}}^{u_{dl}} (Q_l(u))^k p_j \exp\left(-\frac{u}{2(v_j+v_s)}\right) du.$$

Since $Q_l$ is a truncated polynomial, the integrals in (11) may be evaluated using the incomplete gamma function.

The normalization factor, N, of the detection statistic M for each time series is calculated as follows: Under the noise only hypothesis, the mean of the detection statistic, $E(P\hat{M}^1)$, is zero, and the second moment, $E(P\hat{M}^2)$ is obtained from equation (11). Therefore, $N=[E(P\hat{M}^2)]^{1/2}$.

Computer readable program instructions referenced as comparator 54 uses the detection statistic M and the normalization factor N to determine whether a signal is present and to generate an output signal A if a normalized detection statistic is greater than a threshold, as described below:

Given a false alarm probability, $\alpha$, and letting $\Phi$ be the unit normal distribution, the comparator 54, determines a threshold $\tau_\alpha$ for the zero-mean unit-variance normal density which is defined as $$\tau_\alpha = \Phi^{-1}(1-\alpha).$$

The probability of a false alarm is equal to a predetermined false alarm probability suitable for a particular application. A suitable false alarm probability is based on one's tolerance for investigating alarms, based on the cost of a misdetection. For example, if missing a signal of interest would be very costly in terms of man-hours, level of risk, severity of consequences, etc., then a higher false alarm rate would be tolerated. Conversely, if missing a signal of interest would not be very costly, one could tolerate a lower false alarm rate.

Then, the comparator 54 determines the first normalized detection statistic $S_i$, where $S_i=M_i/N_i$, $N_i$ is the output of the parameter dependent normalization factor calculater 50, and $M_i$ is the detection statistic which is the output of detection statistic determinator 46, for each ith range bin, where i is an index. Then, the maximum value, $S_{imax}$ of $S_i$ is identified; the mean value $S_{Mean}$ of all $S_i$ except for $S_{imax}$ is determined; and the standard deviation $S_{Std\,dev}$ of all $S_i$ except for $S_{imax}$ is determined. Finally, a signal is declared present in range bin i if:

$$[S_i-S_{Mean}]/S_{Std\,dev} \geq \tau_\alpha(0, 1).$$

Figure 4:
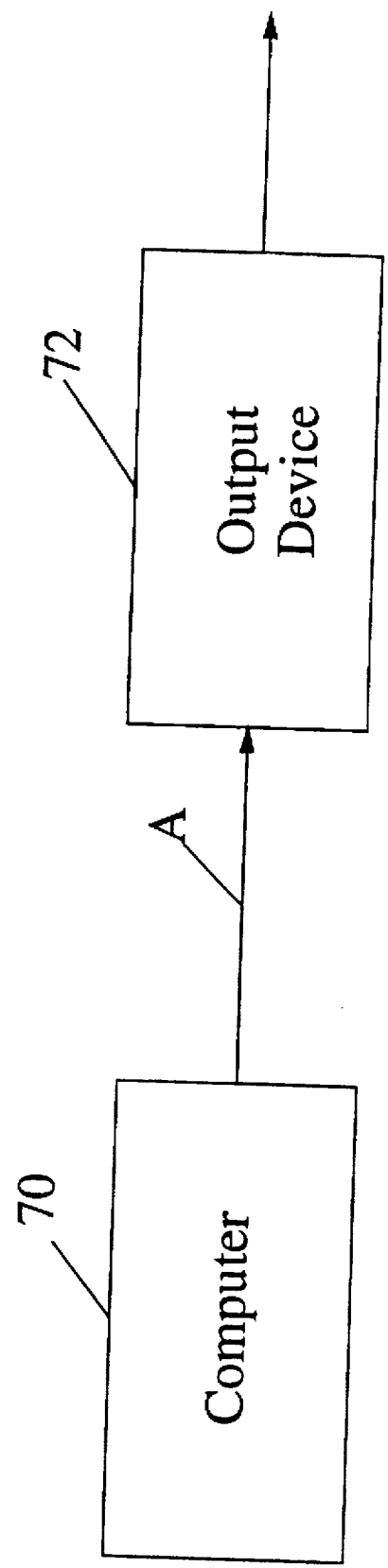
FIG. 4 is a block diagram of the hardware elements which may be used to implement the invention.

Referring to FIG. 4, if a signal is declared present, a computer 70 generates an output signal A The output signal A may be provided to an output device 72, such as a video monitor, printer, audio alarm or other output device capable of providing a human intelligible message indicating that a signal of interest has been detected.

Figure 3:
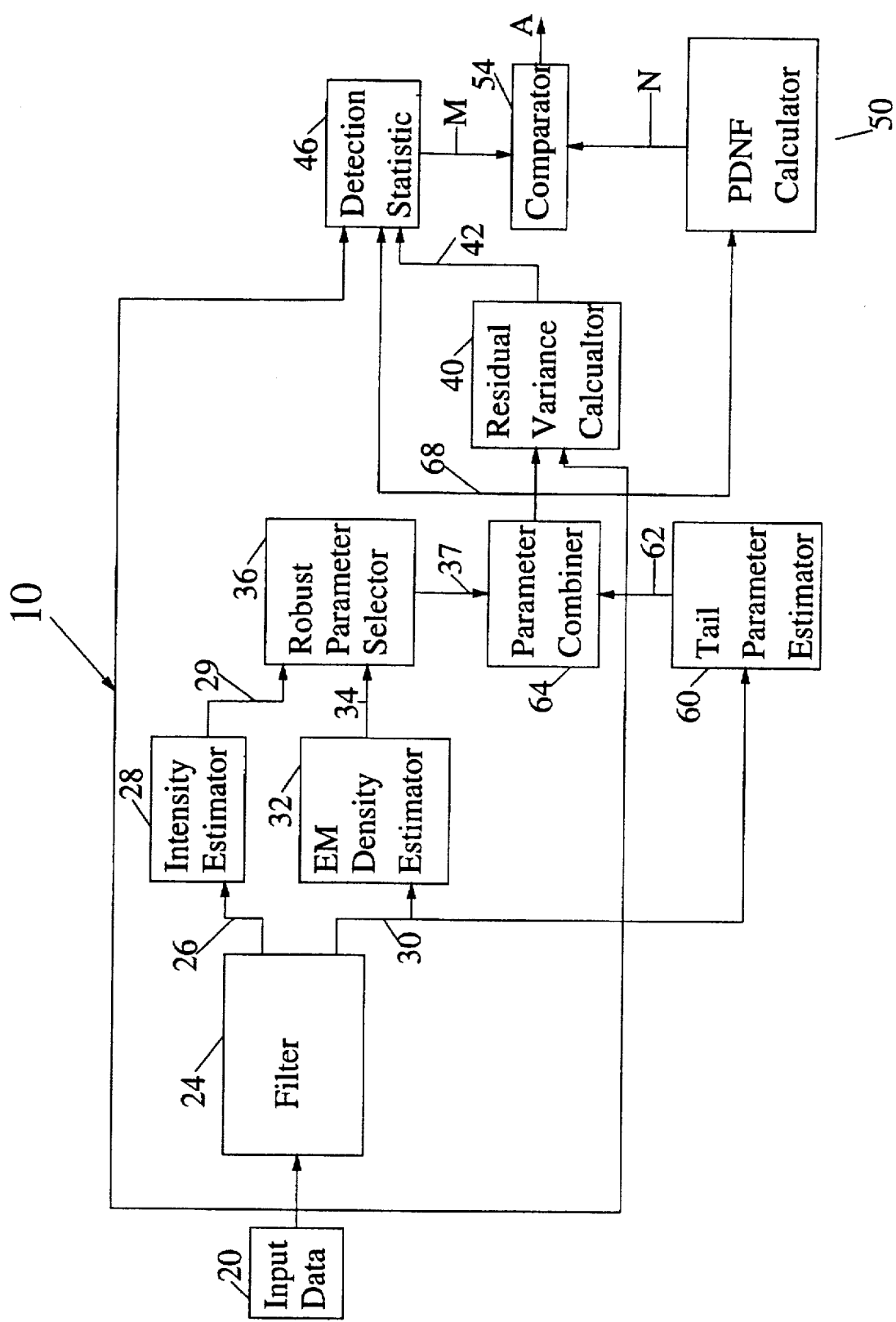
FIG. 3 is a block diagram showing the basic components of another embodiment of a system for detecting signals in non-gaussian background clutter embodying various features of the present invention.

The present invention may also be implemented to further include computer readable program instructions referenced as tail parameter estimator 60 and parameter combiner 64, shown in FIG. 3. The tail parameter estimator 60 receives the data 30 and provides parameter outputs ($v_{m+1}$ and $p_{m+1}$) 62 of an additional state of a Gaussian mixture model or exponential mixture model. The parameters $v_{m+1}$ and $p_{m+1}$ account for high intensity noise that might not otherwise be observed in the neighborhood of a particular range bin. The values $v_{m+1}$ represents the average value of high intensity data 30, and $p_{m+1}$ represents the probability of observing such high intensity input data 30. The values of $v_{m+1}$ and $p_{m+1}$ may be determined by fitting the K highest intensity values (the "tail") of the complementary cumulative distribution of the non-Guassian input data 30 to a decaying exponential function.

The tail parameters may be estimated in accordance with the following steps:

a. The cumulative distribution function, C(x), of the data 30 is calculated using well known techniques.

b. A limit, L, is defined so that the top p percent of the data 30 are greater than L.

c. Using a linear regression, a linear function is fitted to the function log (1–C(x)) for x>L, and the slope, d and y-intercept b of this line are returned.

d. The m+1-state parameters ($v_{m+1}$, $p_{m+1}$) are then defined as $$v_{m+1}=(-2d)^{-1}$$

and $$p_{m+1}=min(e^b, 1-p/100).$$

The parameter combiner (as opposed to the parameter selector) 64 receives the robust estimated noise parameters 37 from the robust parameter selector 36 and the estimated tail parameters 62 from the tail parameter estimator 60, and adds the parameters $p_{m+1}$, $v_{m+1}$ of the data 30 in accordance with the rules set forth as follows to provide estimated noise parameters 68: If $v_{m+1} > v_m^i$, then the parameter combiner 64 combines the tail parameters 62 and the robust parameters 37, $(\hat{p}_1^i, \ldots, \hat{p}_m^i, \hat{v}_1^i, \ldots, \hat{v}_m^i)$ to produce estimated noise parameters 68 of an m+1 state exponential mixture density function for each ith range bin, $(\tilde{p}_1^i, \ldots, \tilde{p}_{m+1}^i, \tilde{v}_1^i, \ldots, \tilde{v}_{m+1}^i)$. The estimated noise parameters 68 generated by the parameter combiner 64 are defined and determined in accordance with the following formulas:

$$\tilde{v}_k^i = \begin{cases} \hat{v}_k^i, & \text{if } 1 \leq k \leq m; \\ v_{m+1}, & k=m+1 \end{cases} \quad (12)$$

$$\tilde{p}_k^i = \begin{cases} \hat{p}_k^i(1-p_{m+1}); & \text{if } 1 \leq k \leq m; \\ p_{m+1}, & k=m+1 \end{cases} \quad (13)$$

Additionally, the parameter combiner 64 coalesces states of the exponential mixture density function or Gaussian mixture density function if its variance terms $\tilde{v}_k^i$ are sufficiently close, i.e., within some predetermined limit, to be practically considered as one state.

Still referring to FIG. 3, for the $i^{th}$ range bin, the residual variance calculator 40 transforms the output 68 and the input data 20 (including both data 26 and data 30) into an estimate output 42 as described above with reference to FIG. 2. Next, the detection statistic calculator 46 transforms the input data 20 and the output 68 and 42 into an exponential mixture amplitude detection statistic, M. The parameter dependent normalization factor calculater 50 uses output 68 to determine a normalization factor, N, for each range bin. The comparator 54 uses the detection statistic M and the normalization factor N to determine whether a signal is present and to generate an output signal A if normalized detection statistic is greater than a threshold. In all other respects, the operations of the residual variance calculator 40, parameter normalization factor calculator 50, and comparator 54, are described above with reference to FIG. 2.

In one alternative embodiment of the invention, the robust parameter selector 36 may be replaced by a minimax parameter selector to provide the robust estimates of the noise parameters 37. The minimax parameters are calculated as follows.

a. Define uncertainty intervals for $p_j$ and $v_j$ denoted $I_{pj}$ and $I_{vj}$ respectively, for $1 \leq j \leq m$, and let $\Delta\theta = I_{p1} \chi \ldots \chi I_{pm} \chi I_{v1} \chi \ldots \chi I_{vm}$. For each range bin the endpoints of the intervals may be determined from the minimum and maximum values of the parameters of the input data on nearby range bins.

b. Select the minimax parameter vector, $\theta_{mm}$, from $\Delta\theta$ as follows. Let $\mu(\theta, \theta_0, 0)$ and $\sigma(\theta, \theta_0, 0)$ be the mean and standard deviation in the noise-only case, as calculated from equation (11), of the processor that uses parameter vector $\theta$ when the true parameter vector is $\theta_0$. The value of $v_s$ used in the weighting function (9) is $$v_s(\theta, \theta_0, 0) = max (0\ cpn\ (\theta) - cpn\ (\theta_0)).$$

The threshold is set at the desired PFA, assuming that the processor parameters, $\theta$, are correct, i.e. if $\lambda_\alpha$ is the threshold of the standard unit normal distribution corresponding to PFA=$\alpha$, then since $\mu(\theta, \theta, 0)=0$, the threshold is $\tau(\alpha, \theta)=\lambda_\alpha \tau(\theta,\theta, 0)$. The actual probability of false alarm is then $$PFA(\alpha,\tilde{\theta},\theta_0) = 1 - \Phi\left( \frac{\tau(\alpha,\tilde{\theta}) - \mu(\tilde{\theta},\theta_0,0)}{\sigma(\tilde{\theta},\theta_0,0)} \right) \quad (14)$$

where $\Phi$ is the unit normal distribution. By definition, $$\theta_{mm} = \frac{arg}{\tilde{\theta}} \left( \min_{\tilde{\theta} \in \Delta\theta} \left( \max_{\theta_0 \in \Delta\theta} PFA(\alpha,\tilde{\theta},\theta_0) \right) \right) \quad (15)$$

Equation (14) may be substituted into equation (15) and the resulting equation may be solved numerically.

Obviously, many modifications and variations of the present invention are possible in light of the above teachings. It is therefore to be understood that within the scope of the appended claims, the invention may be practiced otherwise than as specifically described.

COMMANDING OFFICER
NCCOSC RDTE DIV D0012
53510 SILVERGATE AVENUE RM 103
San Diego, CA 92152-5765
619-553-3001
Navy Case No. 77579

A METHOD FOR DETECTING SIGNALS IN NON-GAUSSIAN BACKGROUND CLUTTER

APPENDIX 1

ROBPARSEL10.m

77579APP.001

Oct  7 12:07 1996  robparsel10.m Page 1

```
1    function [rnpar,rnpow] = robparsel10(unempar2,npow,gbv,perv,nbv,v2oflag,
2    v1flag,pLflag);
3    %function [rnpar,rnpow] = robparsel10(unempar2,npow,gbv,perv,nbv,
4    % v2flag,v2mult,pLflag);
5    % selects parameters from empar2. sets for noise power (np) low variance
6    % v1, and
7    % low variance state probability, p1, are selected by using gb
8    % guard bands and a
9    % total of nbnp, nbv1, and nbp1 points respectively. the parameters
10   % for the bin are
11   % selected as percentiles specified as npper, v1per, and p1per,
12   % respectively. empar should have been denormalized. and npow should be
13   % mbdata/2. npmf is the noise power multiplication
14   % factor. Modified so that gbv, perv, nbv are the guard band, percentile
15   % and number of
16   % bin vectors in the following order p1, v1, np. if v2flag == 1 then the
17   % value of v2 is the min of the original presmoothed value of v2 and the
18   % smoothed
19   % value of v2 multiplied by v2mult. If v2flag == 2, then
20   % v2mult = [K,P], and
21   % the multiplying factor is a function as defined below and has value
22   % P at K.
23   %
24   gbp1 = gbv(1);
25   gbv1 = gbv(2);
26   gbnp = gbv(3);
27   p1per = perv(1);
28   v1per = perv(2);
29   npper = perv(3);
30   nbp1 = nbv(1);
31   nbv1 = nbv(2);
32   nbnp = nbv(3);
33   gbnpe = max(gbnp,1);
34   v1orig = unempar2(2,:);
35   empar2 = unempar2;
36   [npar,nbin] = size(unempar2);
37   medv1 = median(unempar2(2,:));
38   v2vec = unempar2(3,:);
39   sv2vec = sort(v2vec);
40   i98per = ceil(.98*nbin);
41   v298per = sv2vec(i98per);
42   v1mat = [medv1*ones(1,nbin);unempar2(2,:)];
43   maxv1mat = max(v1mat);
44   v1mat2 = [maxv1mat;unempar2(3,:)];
45   rv1v = min(v1mat2);
46   empar2(2,:) = rv1v;
47   roempar2 = zeros(npar,nbin);
48   ronpow = zeros(size(npow));
49   slpar2 = empar2;
50   for ii = 1:nbin
51       if ii <= 2 | nbin-ii <= 2
52           roempar2(:,ii) = unempar2(:,ii);
53           ronpow(ii) = unempar2(1,ii)*unempar2(2,ii) + ...
54               (1-unempar2(1,ii))*unempar2(3,ii);
55       else
```

```
 56            cnpset = setselect(npow,gbnpe,nbnp,ii
```

Oct  7 12:07 1996  robparse110.m  Page 2

```
 57              scnpset = sort(cnpset);
 58              rnp = scnpset(ceil((npper/100)*nbnp));
 59              cv1set = setselect(empar2(2,:),gbv1,nbv1,ii);
 60              cv1seta = [cv1set,empar2(2,ii)];
 61              scv1set = sort(cv1seta);
 62              rv1 = min(scv1set(1+ceil((v1per/100)*nbv1)),npow(ii));
 63              if empar2(3,ii) > rv1
 64                 ap1 = (empar2(3,ii)-npow(ii))/(empar2(3,ii)-rv1);
 65              else
 66                 ap1 = 1;
 67              end;
 68              slpar2(1,ii) = ap1;
 69              slpar2(2,ii) = rv1;
 70              v2 = empar2(3,ii);
 71              rv1sub = min(rnp,max(rv1,1.25*medv1));
 72              if   ap1 < .05 & empar2(2,ii)/rv1 < 1.5
 73                 ap1 = 1;
 74                 slpar2(1,ii) = ap1;
 75                 slpar2(2,ii) = rnp;
 76              elseif ap1 < .05 & empar2(2,ii)/rv1 >= 1.5
 77                  ap1 = 0.0;
 78                  slpar2(1,ii) = ap1;
 79              elseif v2/rv1 < 1.5 & ap1 < .2
 80                 ap1 = 1;
 81                 slpar2(1,ii) = ap1;
 82                 slpar2(2,ii) = rnp;
 83               elseif v2/rv1 < 1.25
 84                 ap1 = 1;
 85                 slpar2(1,ii) = ap1;
 86                   slpar2(2,ii) = rnp;
 87              end;
 88              roempar2(2,ii) = slpar2(2,ii);
 89         end;
 90    end;
 91    v1smooth = roempar2(2,:);
 92    vlo2s = vlorig./v1smooth;
 93    for ii = 3:nbin-3
 94       if vlo2s(ii) >5
 95          cgbnp = gbnpe;
 96       else
 97          cgbnp = gbnp;
 98       end;
 99           cnpset = setselect(npow,cgbnp,nbnp,ii);
100           scnpset = sort(cnpset);
101           rnp = scnpset(ceil((npper/100)*nbnp));
102           cp1set = setselect(slpar2(1,:),gbp1,nbp1,ii);
103           scp1set = sort(cp1set);
104           rp1 = scp1set(ceil((p1per/100)*nbp1));
105        rv1 = roempar2(2,ii);
```

```
106        if rpl < 1
107           rv2  = max(((rnp-rpl*rv1)/(1-rpl),rv1));
108        elseif rnp <= rv1
109           rv2 = rv1;
110           rnp = rv1;
111        else
112           rpl = .7;
```

```
113           rv2  = min(v298per,max(((rnp-rpl*rv1)/(1-rpl),rv1)));
114           rnp  = rpl*rv1+(1-rpl)*rv2;
115        end;
116        roempar2(1,ii) = rpl;
117        roempar2(3,ii) = rv2;
118        ronpow(ii) = rnp;
119     end;
120     psroempar2 = roempar2;
121     % v2 enhancement
122     for ii = 3:nbin-2
123       if vlo2s(ii) < 5
124          rpl = roempar2(1,ii);
125          rv2lag = psroempar2(3,ii-1);
126          rv2lead = psroempar2(3,ii+1);
127          rv1 = roempar2(2,ii);
128          rv2 = roempar2(3,ii);
129          rnp = ronpow(ii);
130          rv2t = rv2;
131          if v2oflag == 3
132             unv2 = unempar2(3,ii);
133             llvrat = max([rv2/rv1 rv2lag/rv1 rv2lead/rv1]);
134             llvmedrat = max([rv2/medv1 rv2lag/medv1 rv2lead/medv1]);
135             cod = min(llvmedrat,llvrat);
136             if ((rpl >= .2 & rpl <= .4) |( rpl>= .6 & rpl <= .8))
137                if llvmedrat < 2
138                   hmultf = 1;
139                elseif llvmedrat < 4
140                   hmultf = 1.25;
141                elseif llvmedrat < 8
142                   hmultf = 1.5;
143                elseif llvmedrat < 16
144                   hmultf  = 2.5;
145                else
146                   hmultf = 3.0;
147                end;
148             elseif rpl > .4 & rpl < .6
149                if llvmedrat < 2
150                   hmultf = 1;
151                elseif llvmedrat < 4
152                   hmultf = 1.5;
153                elseif llvmedrat < 8
154                   hmultf = 2;
155                elseif llvmedrat < 16
```

```
156              hmult    = 2.5;
157          else
158              hmultf =3.0;
159          end;
160        elseif rp1 > .05 & rp1 < .2
161          if cod > 1.25 & cod <= 3
162              hmultf = 1.25;
163          elseif cod >3 & cod <= 8
164              hmultf = 1.5;
165          elseif cod > 8
166              hmultf = 2.0;
167          else
168              hmultf = 1.0;
169          end;
170        else
171          hmultf = 1.0;
172        end;
173        rv2 = max(min(1.1*unv2,rv2t*hmultf),rv1);
174        rnpt = rp1*rv1+(1-rp1)*rv2;
175        if rnpt < rnp
176          if rv2 >= rnp & rv2 > rv1 & rnp > rv1
177              rp1 = (rv2-rnp)/(rv2-rv1);
178          else
179              rp1 = 1;
180              rv1 = max(rv1,rnp);
181          end;
182          roempar2(:,ii) = [rp1 rv1 rv2]';
183        end;
184      end;
185      roempar2(3,ii) = rv2;
186    %  scale p1
187      if pLflag == 1 & vlo2s(ii) < 2 & rp1 < .98
188        if rp1 > .8
189          rp1 = .7*rp1;
190        elseif rp1 > .65
191          rp1 = .8*rp1;
192        elseif rp1 > .5
193          rp1 = .9*rp1;
194        end;
195        roempar2(1,ii) = rp1;
196      end;
197      if v1flag == 1 & vlo2s(ii) < 3 & rv2/rv1 >= 5
198        if (rp1>= .2 & rp1 <= .35) | (rp1 >=  .65 & rp1<= .8)
199          v1multf = 1.25;
200        elseif rp1 > .35 & rp1 <.65
201          v1multf = 1.5;
202        else
203          v1multf = 1;
204        end;
205        rv1 = rv1*v1multf;
```

```
206              roempar2(  ,i) = rv1;
207          end;
208          ronpow(ii) = rp1*rv1+(1-rp1)*rv2;
209       end;
210   end;
211   rnpow = ronpow;
212   rnpar = roempar2;
213
214
215
216
217
```

I claim:

1. A method for detecting signals in non-Gaussian background clutter, comprising the steps of:
   1) filtering input data to partition Gaussian input data from non-Gaussian input data;
   2) estimating the intensity level of the Gaussian input data;
   3) determining the probability distributions of the non-Gaussian input data.
   4) determining the background noise level of the input data;
   5) estimating noise parameters of the input data;
   6) estimating the residual intensity of the input data using the noise parameters;
   7) determining a detection statistic $M_i$ from the input data, estimated noise parameters, and the residual intensity of the input data;
   8) determining the standard deviation $N_i$ of the detection statistic, $M_i$;
   9) determining a normalized detection statistic $S_i$, where $S_i = M_i/N_i$.
   10) determining a maximum value, $S_{imax}$ of $S_i$;
   11) determining a mean value $S_{Mean}$ and a standard deviation $S_{Std\ dev}$ of all $S_i$ excluding $S_{imax}$;
   12) determining a threshold $\tau_\alpha$ of a zero mean unit variance normal distribution corresponding to a predetermined false alarm probability, where $\alpha$ is a predetermined false alarm probability; and
   13) generating an output signal if $[S_i - S_{Mean}]/S_{Std\ dev} \geq \tau_\alpha$.

2. The method of claim 1 wherein step (3) further includes estimating first parameters of an exponential mixture family of probability density functions for the non-Gaussian input data, whereby a subset of first parameters represents the background intensity of the non-Gaussian input data.

3. The method of claim 2 wherein step (4) further includes applying a smoothing filter to the estimated intensities of the Gaussian input data determined at step (2) and the background intensity of the non-Gaussian input data to provide an estimated background noise intensity.

4. The method of claim 1 wherein step (3) further includes estimating first parameters of an Gaussian mixture family of probability density functions for the non-Gaussian input data, whereby a subset of first parameters represents the background intensity of the non-Gaussian input data.

5. The method of claim 4 wherein step (4) further includes applying a smoothing filter to the estimated intensities of the Gaussian input data determined at step (2) and the background intensity of the non-Gaussian input data to provide an estimated background noise intensity.

6. The method of claim 1 step (5) further includes:
   adjusting estimates of a selected set of the first parameters that are a predetermined level below the estimated background noise level of the input data;
   creating uncertainty sets for the first parameters; and
   selecting a set of the first parameters from the uncertainty intervals to define a probability density function.

7. The method of claim 6 wherein step (5) further includes selecting second parameters from said uncertainty set to mimimize the maximum value of a false alarm probability function.

8. The method of claim 7 wherein step (5) includes scaling values of said second parameters.

9. The method of claim 6 wherein step (5) further includes selecting third parameters from said uncertainty set using an order statistic.

10. The method of claim 9 wherein step (5) includes scaling values of said third parameters.

11. The method of claim 2 further includes fitting said input data having the n greatest intensity values to a decaying exponential function to generate a high intensity term of said exponential mixture function, where n is a positive integer.

12. The method of claim 2 further including fitting said input data having the n greatest intensity values to a decaying exponential function to generate a high intensity term of said Gaussian mixture density function.

13. The method of claim 12 further including the step of combining the noise parameters from step (5) with the high intensity term.

14. The method of claim 2 wherein step (6) further includes the steps of:
   determining the average intensity of said input data; and
   determining an estimated signal strength value of the input data as the maximum of zero and the difference between the average intensity of said input data and the expected noise intensity calculated from the noise parameters of the input data from step (5).

15. The method of claim 2 wherein step (6) further includes using a maximum likelihood estimator to determine an estimated signal strength value of the input data.

16. The method of claim 1 wherein step (7) further includes determining a modified optimal detection statistic.

17. A program storage device readable by a machine, tangibly embodying a program of instructions executable by the machine to perform method steps, the method steps comprising:
   1) filtering input data to identify Gaussian input data and non-Gaussian input data;
   2) estimating the intensity level of the Gaussian input data;
   3) determining the probability distributions of the non-Gaussian input data.
   4) determining the background noise level of the input data;
   5) estimating noise parameters of the input data;
   6) estimating the residual intensity of the input data using the noise parameters;
   7) determining a detection statistic M from the input data, estimated noise parameters, and the residual intensity of the input data;
   8) determining a standard deviation $N_i$ of the detection statistic, $M_i$;
   9) determining a normalized detection statistic Si, where $S_i = M_i/N_i$.
   10) determining a maximum value, $S_{imax}$ of $S_i$,
   11) determining a mean value $S_{Mean}$ and a standard deviation $S_{Std\ dev}$ of all $S_i$ excluding $S_{imax}$;
   12) determining a threshold $\tau_\alpha$ of a zero mean unit variance normal distribution corresponding to a predetermined false alarm probability, where $\alpha$ is a predetermined false alarm probability; and
   13) generating an output signal if $[S_i - S_{Mean}]/S_{Std\ dev} \leq \tau_\alpha$.

18. The program storage device of claim 17 wherein step (3) further includes estimating first parameters of an exponential mixture family of probability density functions for the non-Gaussian input data, whereby a subset of first parameters represents the background intensity of the non-Gaussian input data.

19. The program storage device of claim 17 wherein step (4) further includes applying a smoothing filter to the estimated intensities of the Gaussian input data determined at step (2) and the background intensity of the non-Gaussian input data to provide an estimated background noise intensity.

20. The program storage device of claim 17 wherein step (3) further includes estimating first parameters of an Gaussian mixture family of probability density functions for the non-Gaussian input data, whereby a subset of first parameters represents the background intensity of the non-Gaussian input data.

21. The program storage device of claim 20 wherein step (4) further includes applying a smoothing filter to the estimated intensities of the Gaussian input data determined at step (2) and the background intensity of the non-Gaussian input data to provide an estimated background noise intensity.

22. The program storage device of claim 17 step (5) further includes:

adjusting estimates of a selected set of the first parameters that are a predetermined level below the estimated background noise level of the input data;

creating uncertainty sets for the first parameters; and selecting a set of the first parameters from the uncertainty intervals to define a probability density function.

23. The program storage device of claim 22 wherein step (5) further includes selecting second parameters from said uncertainty set to mimimize the maximum value of a false alarm probability function.

24. The program storage device of claim 23 wherein step (5) includes scaling values of said second parameters.

25. The program storage device of claim 22 wherein step (5) further includes selecting third parameters from said uncertainty set using an order statistic.

26. The program storage device of claim 25 wherein step (5) includes scaling values of said third parameters.

27. The program storage device of claim 18 further includes fitting said input data having the n greatest intensity values to a decaying exponential function to generate a high intensity term of said exponential mixture function, where n is a positive integer.

28. The program storage device of claim 18 further including fitting said input data having the n greatest intensity values to a decaying exponential function to generate a high intensity term of said Gaussian mixture density function.

29. The program storage device of claim 28 further including the step of combining the noise parameters from step (5) with the high intensity term.

30. The program storage device of claim 18 wherein step (6) further includes the steps of:

determining the average intensity of said input data; and determining an estimated signal strength value of the input data as the maximum of zero and the difference between the average intensity of said input data and the expected noise intensity calculated from the noise parameters of the input data from step (5).

31. The program storage device of claim 18 wherein step (6) further includes using a maximum likelihood estimator to determine an estimated signal strength value of the input data.

32. The program storage device of claim 17 wherein step (7) further includes determining a modified optimal detection statistic.

33. The program storage device of claim 32 wherein step (8) further includes determining the mean and standard deviation of said detection statistic.

34. The program storage device of claim 32 wherein step (8) further includes determining a threshold from the mean and standard deviation of said detection statistic and a predetermined false alarm.

35. A method for detecting signals in non-Gaussian background clutter, comprising the steps of:

1) filtering input data to partition Rayleigh input data from non-Rayleigh input data;

2) estimating the intensity level of the Rayleigh input data;

3) determining the probability distributions of the non-Rayleigh input data.

4) determining the background noise level of the input data;

5) estimating noise parameters of the input data;

6) estimating the residual intensity of the input data using the noise parameters;

7) determining a detection statistic $M_i$ from the input data, estimated noise parameters, and the residual intensity of the input data;

8) determining the standard deviation $N_i$ of the detection statistic, $M_i$;

9) determining a normalized detection statistic $S_i$, where $S_i = M_i/N_i$, 10) determining a maximum value, $S_{imax}$ of $S_i$;

11) determining a mean value $S_{Mean}$ and a standard deviation $S_{Std\ dev}$ of all $S_i$ excluding $S_{imax}$;

12) determining a threshold $\tau_\alpha$ of a zero mean unit variance normal distribution corresponding to a predetermined false alarm probability, where $\alpha$ is a predetermined false alarm probability; and 13) generating an output signal if $[S_i - S_{Mean}]/S_{Std\ dev} \geq \tau_\alpha$.

36. A method for detecting signals in non-Gaussian background clutter, comprising the steps of:

1) filtering input data to partition exponential input data from non-exponential input data;

2) estimating the intensity level of the exponential input data;

3) determining the probability distributions of the non-exponential input data.

4) determining the background noise level of the input data;

5) estimating noise parameters of the input data;

6) estimating the residual intensity of the input data using the noise parameters;

7) determining a detection statistic $M_i$ from the input data, estimated noise parameters, and the residual intensity of the input data;

8) determining the standard deviation $N_i$ of the detection statistic, $M_i$;

9) determining a normalized detection statistic $S_i$, where $S_i = M_i/N_i$, 10) determining a maximum value, $S_{imax}$ of $S_i$;

11) determining a mean value $S_{Mean}$ and a standard deviation $S_{Std\ dev}$ of all $S_i$ excluding $S_{imax}$;

12) determining a threshold $\tau_\alpha$ of a zero mean unit variance normal distribution corresponding to a predetermined false alarm probability, where $\alpha$ is a predetermined false alarm probability; and 13) generating an output signal if $[S_i - S_{Mean}]/S_{Std\ dev} \geq \tau_\alpha$.

37. A program storage device readable by a machine, tangibly embodying a program of instructions executable by the machine to perform method steps, the method steps comprising:

1) filtering input data to partition Rayleigh input data from non-Rayleigh input data;
2) estimating the intensity level of the Rayleigh input data;
3) determining the probability distributions of the non-Rayleigh input data.
4) determining the background noise level of the input data;
5) estimating noise parameters of the input data;
6) estimating the residual intensity of the input data using the noise parameters;
7) determining a detection statistic $M_i$ from the input data, estimated noise parameters, and the residual intensity of the input data;
8) determining the standard deviation $N_i$ of the detection statistic, $M_i$;
9) determining a normalized detection statistic $S_i$, where $S_i=M_i/N_i$,
10) determining a maximum value, $S_{imax}$ of $S_i$;
11) determining a mean value $S_{Mean}$ and a standard deviation $S_{Std\ dev}$ of all $S_i$ excluding $S_{imax}$;
12) determining a threshold $\tau_\alpha$ of a zero mean unit variance normal distribution corresponding to a predetermined false alarm probability, where $\alpha$ is a predetermined false alarm probability; and
13) generating an output signal if $[S_i-S_{Mean}]/S_{Std\ dev} \geq \tau_\alpha$.

38. A program storage device readable by a machine, tangibly embodying a program of instructions executable by the machine to perform method steps, the method steps comprising:

1) filtering input data to partition exponential input data from non-exponential input data;
2) estimating the intensity level of the exponential input data;
3) determining the probability distributions of the non-exponential input data.
4) determining the background noise level of the input data;
5) estimating noise parameters of the input data;
6) estimating the residual intensity of the input data using the noise parameters;
7) determining a detection statistic $M_i$ from the input data, estimated noise parameters, and the residual intensity of the input data;
8) determining the standard deviation $N_i$ of the detection statistic, $M_i$;
9) determining a normalized detection statistic $S_i$, where $S_i=M_i/N_i$,
10) determining a maximum value, $S_{imax}$ of $S_i$;
11) determining a mean value $S_{Mean}$ and a standard deviation $S_{Std\ dev}$ of all $S_i$ excluding $S_{imax}$;
12) determining a threshold $\tau_\alpha$ of a zero mean unit variance normal distribution corresponding to a predetermined false alarm probability, where $\alpha$ is a predetermined false alarm probability; and
13) generating an output signal if $[S_i-S_{Mean}]/S_{Std\ dev} \geq \tau_\alpha$.

* * * * *